(12) United States Patent
Takeda

(10) Patent No.: US 12,510,719 B2
(45) Date of Patent: Dec. 30, 2025

(54) ACCOMMODATION UNIT AND METHOD FOR MANUFACTURING ACCOMMODATION UNIT

(71) Applicant: Fujikura Ltd., Tokyo (JP)

(72) Inventor: Rikimaru Takeda, Chiba (JP)

(73) Assignee: Fujikura Ltd., Tokyo (JP)

( * ) Notice: Subject to any disclaimer, the term of this patent is extended or adjusted under 35 U.S.C. 154(b) by 463 days.

(21) Appl. No.: 18/247,747

(22) PCT Filed: Aug. 4, 2021

(86) PCT No.: PCT/JP2021/028996
§ 371 (c)(1),
(2) Date: Apr. 4, 2023

(87) PCT Pub. No.: WO2022/180886
PCT Pub. Date: Sep. 1, 2022

(65) Prior Publication Data
US 2023/0333345 A1    Oct. 19, 2023

(30) Foreign Application Priority Data
Feb. 26, 2021    (JP) .................................. 2021-031159

(51) Int. Cl.
*G02B 6/00*    (2006.01)
*G02B 6/44*    (2006.01)

(52) U.S. Cl.
CPC ....... *G02B 6/4455* (2013.01); *G02B 6/44526* (2023.05)

(58) Field of Classification Search
CPC ..... G02B 6/4455; G02B 6/44526; G02B 6/00
See application file for complete search history.

(56) References Cited

U.S. PATENT DOCUMENTS 7,720,344 B2 * 5/2010 Tang .................. G02B 6/44528
                                                  385/134
8,408,506 B2 * 4/2013 Yu ........................ H05K 7/1489
                                                  248/220.22

(Continued)

FOREIGN PATENT DOCUMENTS

JP    S63-135307 U    9/1988
JP    H09-197144 A    7/1997

(Continued)

OTHER PUBLICATIONS

International Search Report issued in corresponding International Application No. PCT/JP2021/028996 mailed Nov. 2, 2021 (4 pages).

*Primary Examiner* — Jennifer Doan
(74) *Attorney, Agent, or Firm* — Osha Bergman Watanabe & Burton LLP

(57) ABSTRACT

An accommodation unit includes: a casing that: stores trays each storing an optical fiber, and includes an insertion opening into which the trays are inserted to be arranged in an up-down direction; and support members disposed in the casing, each of the support members slidably supporting a lower part of each of the trays, and each of the support members including: a pair of arm parts disposed apart from each other in a left-right direction orthogonal to a slide direction of the trays and the up-down direction; and a projection that is disposed on each of the arm parts in a vicinity of the insertion opening, and contacts an upper part of each of the trays under each of the support members.

11 Claims, 13 Drawing Sheets

(56) References Cited

U.S. PATENT DOCUMENTS 9,417,417 B2 * 8/2016 Loeffelholz .......... G02B 6/4457
10,795,105 B1 10/2020 Li

FOREIGN PATENT DOCUMENTS

| JP | 2000-206342 A | 7/2000 |
| JP | 3107704 U | 2/2005 |
| JP | 2008-225318 A | 9/2008 |

* cited by examiner

ACCOMMODATION UNIT AND METHOD FOR MANUFACTURING ACCOMMODATION UNIT

CROSS-REFERENCE TO RELATED APPLICATION

This application is based on and claims priority under 35 U.S.C. § 119 from Japanese Patent Application No. 2021-031159 filed on Feb. 26, 2021, the contents of which are incorporated herein by reference.

TECHNICAL FIELD

Background

The present disclosure relates to an accommodation unit and a method for manufacturing an accommodation unit.

Description of Related Art

PTL 1 discloses a cabinet configured to store trays in which optical fibers are stored. PTL 1 also discloses a slide mechanism for sliding a plurality of trays stored in multiple stages.

PATENT LITERATURE

[PTL 1] Japanese Utility Model Registration No. 3107704

Along with increase in the density of optical fibers, if a large number of optical fibers are stored in a tray, the weight of the tray increases. As a result, the frictional force that acts on the tray increases, making it difficult to slide the tray. In addition, deformation of the tray makes it difficult to slide the tray.

SUMMARY

One or more embodiments of the present disclosure improve sliding properties of trays with a simple configuration.

A first aspect of the present disclosure is an accommodation unit comprising: a casing including an insertion opening into which trays each configured to store an optical fiber are inserted, wherein the casing is configured to store the trays to be arranged in an up-down direction; and support members disposed in the casing, wherein each support member is configured to slidably support a lower part of the tray, wherein the support member includes: a pair of arm parts disposed apart from each other in a left-right direction orthogonal to a slide direction of the tray and the up-down direction; and a projection part (or a projection) disposed on each arm part in a position near (in a vicinity of) the insertion opening and configured to interfere with (contact) an upper part of the tray stored under the support member.

A second aspect of the present disclosure is a method for manufacturing an accommodation unit, the method comprising: forming arm parts by bending metal plates; and forming a casing by placing a pair of the metal plates to be apart from each other, wherein an accommodation unit includes the casing including an insertion opening into which trays each configured to store an optical fiber are inserted, wherein the casing is configured to store the trays to be arranged in an up-down direction; and disposing support members in the casing, wherein each support member is configured to slidably support a lower part of the tray, wherein the support member includes a pair of the arm parts disposed apart from each other in a left-right direction orthogonal to a slide direction of the tray and the up-down direction, and a projection part (or a projection) disposed on each arm part in a position near (in a vicinity of) the insertion opening and configured to interfere with (contact) an upper part of the tray stored under the support member.

Other features of the present disclosure will become apparent from the description in the specification and drawings described later.

One or more embodiments of the present disclosure can improve sliding properties of trays with a simple configuration.

DETAILED DESCRIPTION OF EMBODIMENTS

Embodiments which are examples of the disclosure of the present application will be described in accordance with description in the specification and drawings described later.

Figure 1:
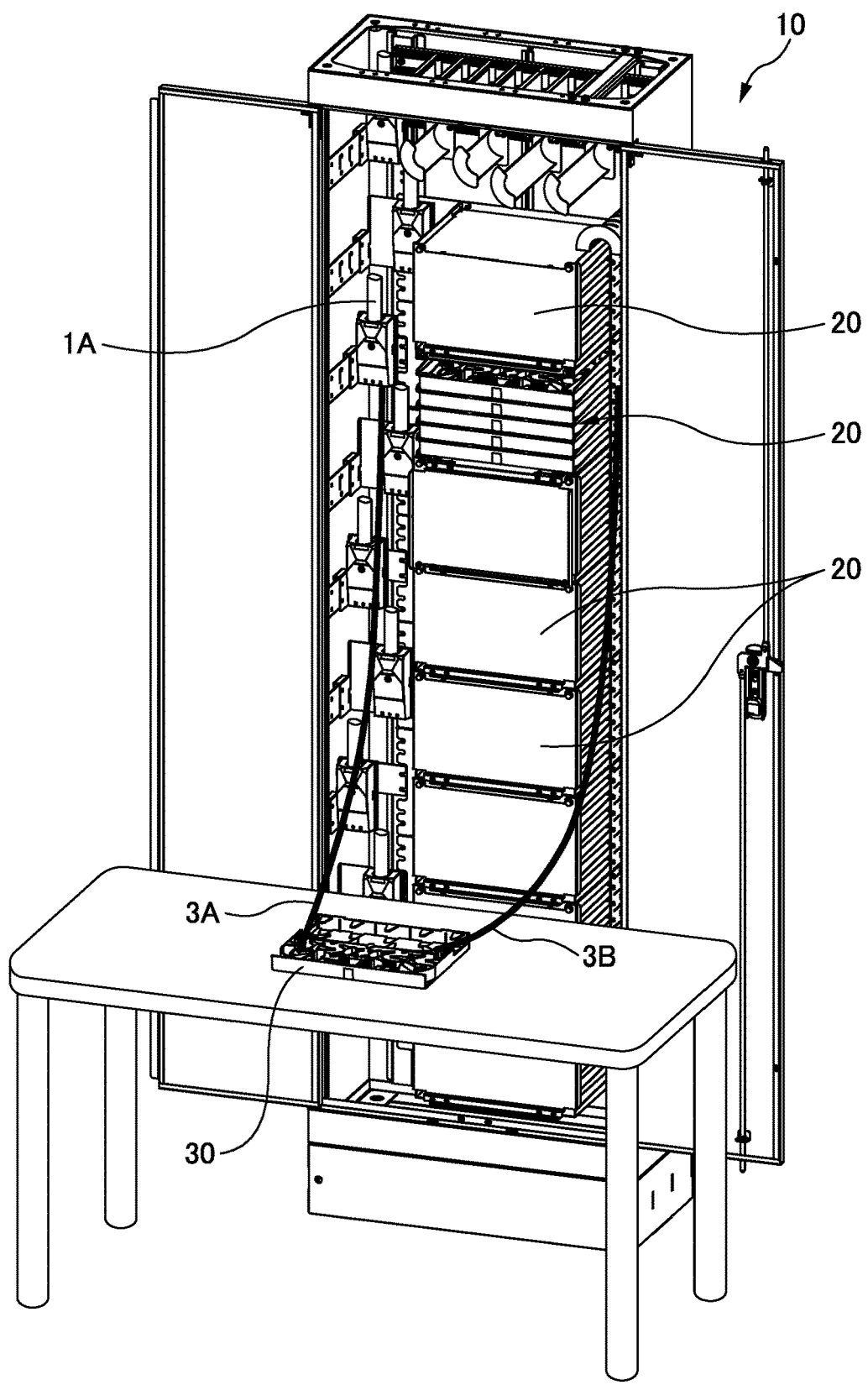
FIG. 1 is an explanatory diagram of a cabinet 10.

FIG. 1 is an explanatory diagram of a cabinet 10. Two optical cables 1 (a first optical cable 1A and a second optical cable 1B (not illustrated)) are introduced into the cabinet 10. Each optical cable 1 contains a plurality of optical fiber units 3 (a plurality of bundles of optical fibers). An optical fiber unit 3 includes a plurality of bundles of optical fiber ribbons and thus has a plurality of optical fibers. The figure illustrates one first optical fiber unit 3A of one optical cable 1 (the first optical cable 1A) and one second optical fiber unit 3B of the other optical cable 1 (the second optical cable 1B). However, in the actual situation, a large number of optical fiber units 3 are wired in the cabinet 10. The optical fiber unit 3 branched from the optical cable 1 is inserted through and protected by a protective tube (for example, a mesh tube)

and wired in the cabinet 10. However, the optical fiber unit 3 may be a plurality of bundles of optical fibers that are not covered with a protective tube. Each of a large number of optical fibers (first optical fibers) of one optical cable 1 is connected to the corresponding one of a large number of optical fibers (second optical fibers) of the other optical cable 1, and a large number of connecting parts at each of which two optical fibers are connected are stored in the cabinet 10.

In one or more embodiments, each optical fibers are fusion spliced. This means that the cabinet 10 stores a large number of fusion splice parts. Hence, the cabinet 10 may also be called as the fusion rack. However, optical fibers may be connected by a method other than fusion splicing. The cabinet 10 may also be referred to as the rack. The cabinet 10 includes a plurality of accommodation units 11. The figure illustrates the optical fibers of the first optical fiber unit 3A and the optical fibers of the second optical fiber unit 3B being fusion spliced (the figure illustrates the fusion splice parts stored in a tray 30 and extra lengths of optical fibers stored in the tray 30).

Figure 2:
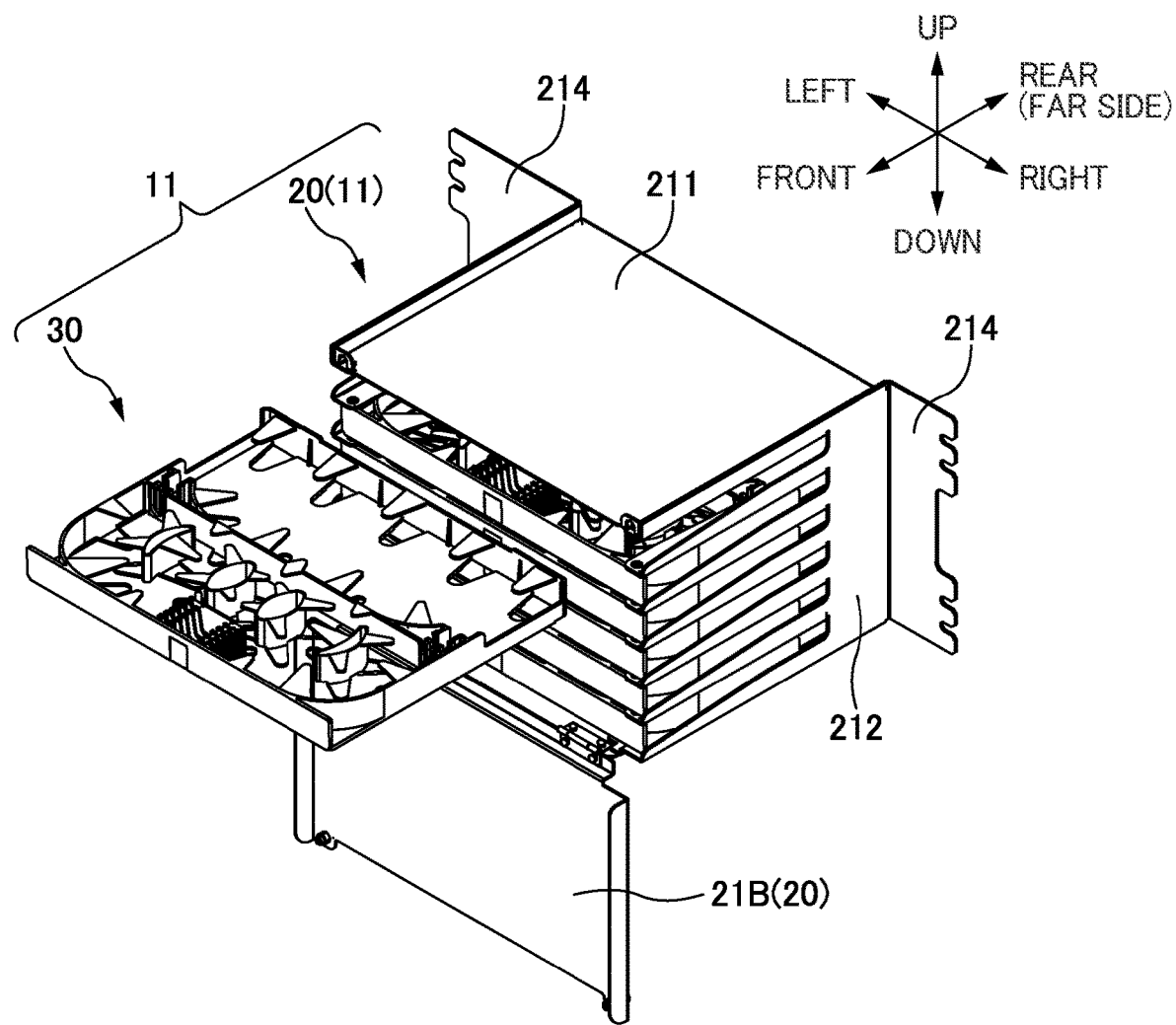
FIG. 2 is an explanatory diagram of an accommodation unit 11.

FIG. 2 is an explanatory diagram of an accommodation unit 11. In the foregoing cabinet 10, a plurality of accommodation units 11 illustrated in FIG. 2 are arranged in the up-down direction (see FIG. 1).

In the following description, the directions are defined as indicated in FIG. 2. The direction in which a plurality of trays 30 stored in the accommodation unit 11 are arranged is defined as the "up-down direction". The bottom side of the tray 30 is defined as the "down side", and the opposite side to the down side (the opening side of the tray 30) as the "up side". Note that the vertical direction is defined as the "up-down direction", the up side of the vertical direction as the "up side", and the down side of the vertical direction as the "down side". The direction in which the tray 30 slides is defined as the "front-rear direction", the side on which the tray 30 is drawn as the "front side", and the opposite side to the front side as the "rear side". Note that the direction in which the tray 30 slides may also be called the "slide direction" or the "insertion-drawing direction", and the rear may also be called the "far side". The direction perpendicular to the up-down direction and the front-rear direction (slide direction) is defined as the "left-right direction". The right side when viewing the accommodation unit 11 from the front side is defined as the "right side", and the opposite side as the "left side".

The accommodation unit 11 includes an accommodation rack 20 and a plurality of trays 30. Note that the accommodation unit 11 not storing trays 30 (an accommodation rack 20 alone, an empty accommodation unit 11) may also be referred to as the accommodation unit.

The accommodation rack 20 is a member configured to accommodate a plurality of trays 30. The accommodation rack 20 has a front panel 21B. When the front panel 21B is opened, the tray 30 can be drawn from the accommodation rack 20. However, a configuration in which the accommodation rack 20 does not have the front panel 21B is possible. The accommodation rack 20 has a casing 21 and a plurality of support members 22.

Figure 3A:
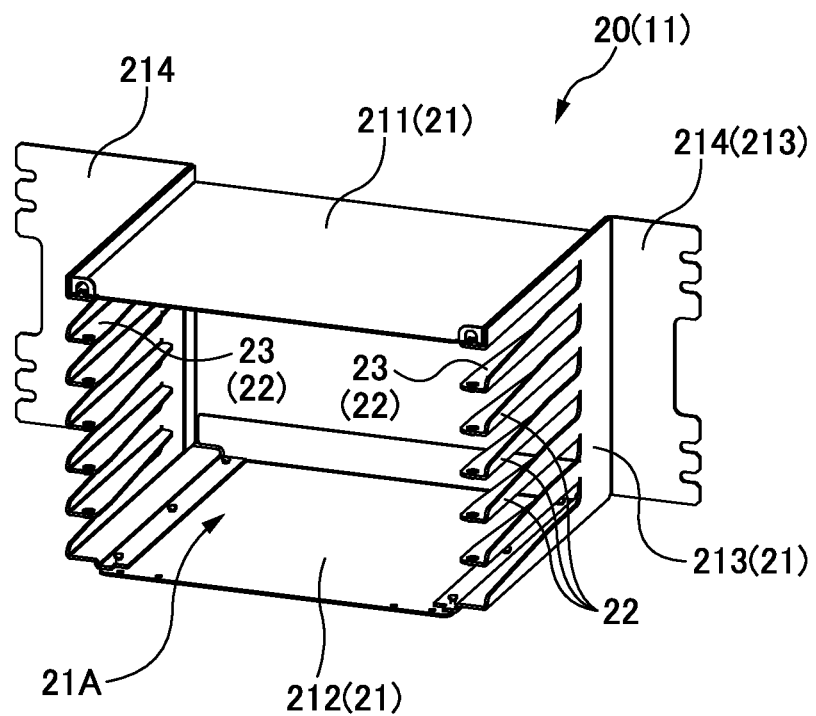
FIG. 3A is a perspective view of a casing 21.
Figure 3B:
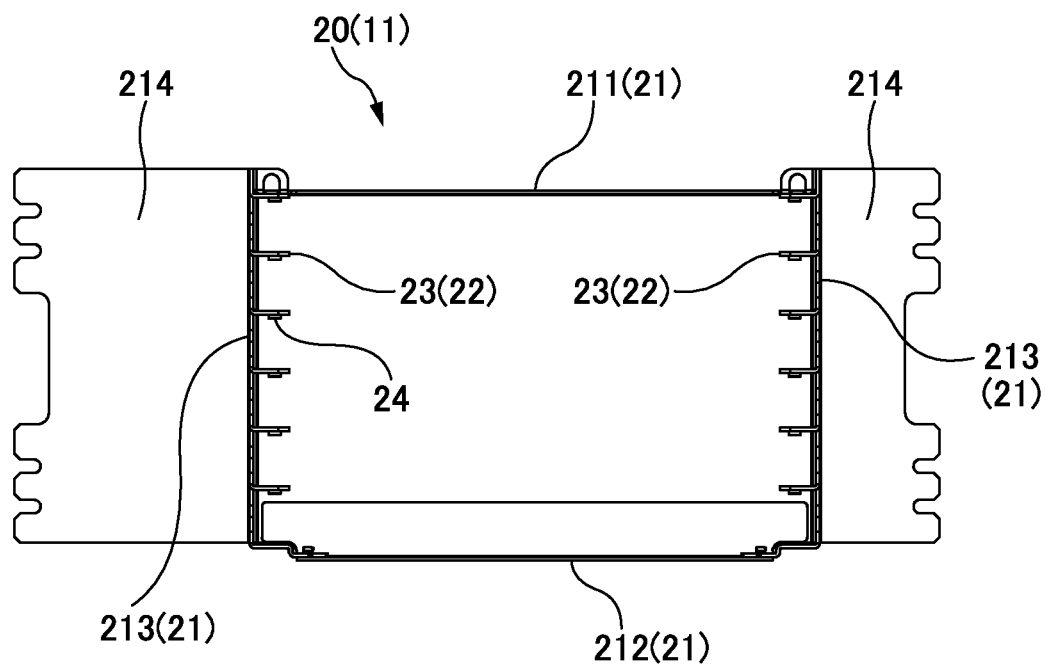
FIG. 3B is a front view of the casing 21.

FIG. 3A is a perspective view of the casing 21. FIG. 3B is a front view of the casing 21. FIGS. 3A and 3B illustrate the casing 21 with the front panel 21B omitted.

The casing 21 has an insertion opening 21A configured to enable trays 30 to be inserted thereinto and is a member (an outer frame, frame) configured to store a plurality of trays 30 to be arranged in the up-down direction. The casing 21 is a member that surrounds the plurality of trays 30 arranged in the up-down direction from above and below and from the right and left. The casing 21 includes an upper plate 211, a lower plate 212, and a pair of side plates 213. The upper plate 211 is a member serving as the upper face of the casing 21. The upper plate 211 is a member that covers from above the tray 30 stored at the uppermost position. The lower plate 212 is a member serving as the lower surface of the casing 21. The lower plate 212 is a member that faces the bottom surface of the tray 30 stored at the lowermost position. The lower plate 212 is a member that prevents trays 30 from falling below. The pair of side plates 213 are members serving as the side faces of the casing 21. The casing 21 is configured to surround the plurality of trays 30 with the upper plate 211, the lower plate 212, and the pair of side plates 213. The casing 21 has the insertion opening 21A on the front face. The insertion opening 21A is an opening configured to enable trays 30 to be inserted thereinto. When the front panel 21B is closed, the insertion opening 21A is closed.

Note that the casing 21 has fixing parts 214. The fixing parts 214 are used to fix the casing 21 to the cabinet 10. In one or more embodiments, the fixing parts 214 are formed by bending metal plates serving as the side faces of the casing 21 into L shapes. In other words, in one or more embodiments, the side plate 213 and the fixing part 214 are composed of one member. This reduces the parts count. However, the fixing part 214 may be configured from a different member from the side plate 213.

Figure 4A:
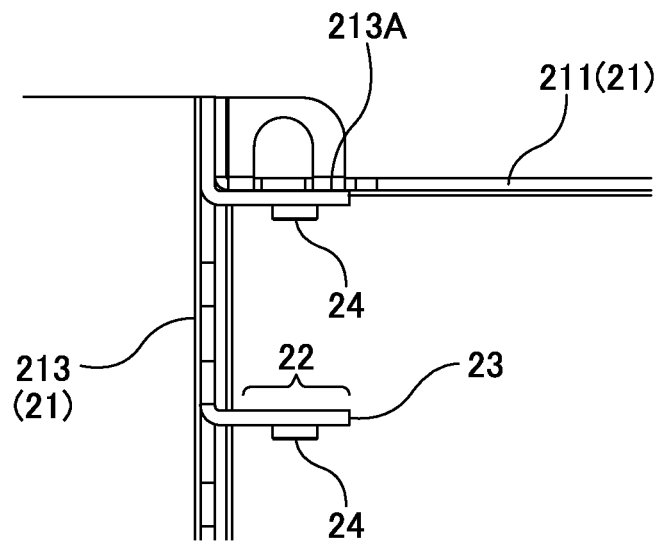
FIG. 4A is a front view of an upper edge and its vicinities of the casing 21.

FIG. 4A is a front view of an upper edge and its vicinities of the casing 21.

Figure 5A:
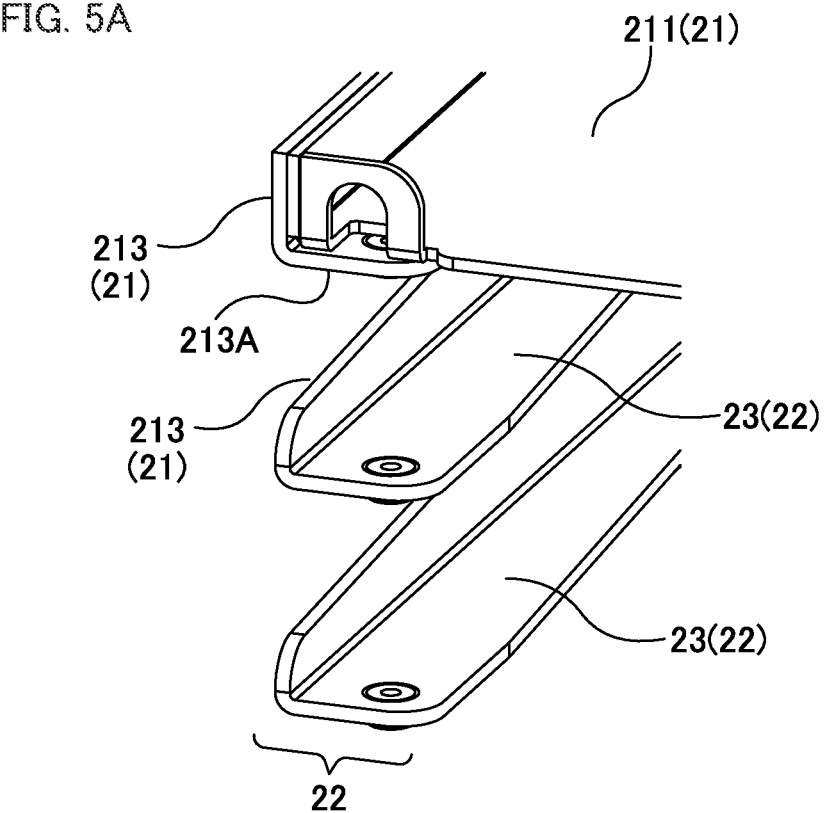
FIGS. 5A and 5B are explanatory diagrams of support members 22.

The side plate 213 includes an upper-plate fixing part 213A (see also FIG. 5A). The upper-plate fixing part 213A is a part to which the upper plate 211 is fixed. In one or more embodiments, the upper-plate fixing part 213A is formed by bending the metal plate serving as the side face of the casing 21 into an L shape (described later, see FIG. 12A). In other words, in one or more embodiments, the side plate 213 and the upper-plate fixing part 213A are composed of one member. This reduces the parts count. However, the upper-plate fixing part 213A and the side plate 213 may be different members.

Figure 5B:
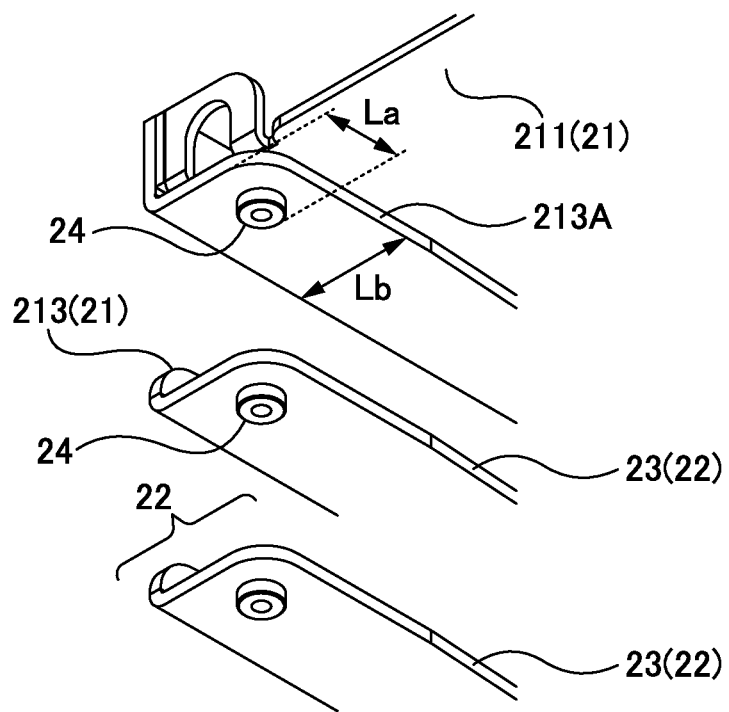

FIGS. 5A and 5B are an explanatory diagrams of the support members 22.

The support members 22 are located in the casing 21 and are members (parts) that support a lower part of the tray 30 such that the tray 30 is slidable. Each support member 22 supports the corresponding tray 30. To store a plurality of (in this case, six) trays 30 to be arranged in the up-down direction, a plurality of (in this case, six) support members 22 are arranged in the up-down direction. Each support member 22 has a pair of arm parts 23 and projection parts 24.

The arm parts 23 are configured to support lower parts of the tray 30. The arm parts 23 protrude from the inner wall surfaces of the side plates 213 inward in the left-right direction. The arm parts 23 have a surface parallel to the slide direction (front-rear direction) to support the tray 30 such that the tray 30 is slidable. As illustrated in FIG. 3, the pair of arm parts 23 are located apart in the left-right direction. The pair of arm parts 23 protrude from the respective left and right side plates 213 inward in the left-right direction. The inner wall surface of each of the left and right side plates 213 has a plurality of arm parts 23 arranged in the up-down direction. Note that the arm parts 23 in one or more embodiments are formed by bending the metal plate serving as the side face of the casing 21 into L shapes (this is described later. see FIG. 12A).

The width in the left-right direction of the arm part 23 decreases toward the rear in the slide direction (toward the far side) (see FIGS. 3A and 5A). Note that in the case in which the width of the arm part 23 is constant in the slide direction, the contact area between the tray 30 and the arm part 23 is large when the tray 30 is moved rearward to be stored (toward the far side). In that case, the frictional force between the tray 30 and the arm part 23 is large, and there is a possibility that the tray 30 cannot be smoothly stored. In contrast, in the case in which the width in the left-right direction of the arm part 23 decreases toward the rear in the slide direction (toward the far side) as in one or more embodiments, it is possible to prevent increasing in the contact area between the tray 30 and the arm part 23 when the tray 30 is moved rearward to be stored (toward the far side). Therefore, this configuration can prevent increasing in the frictional force between the tray and the arm part 23, and this makes it possible to store the tray 30 smoothly. However, a configuration in which the width of the arm part 23 is constant in the slide direction is possible.

Figure 4B:
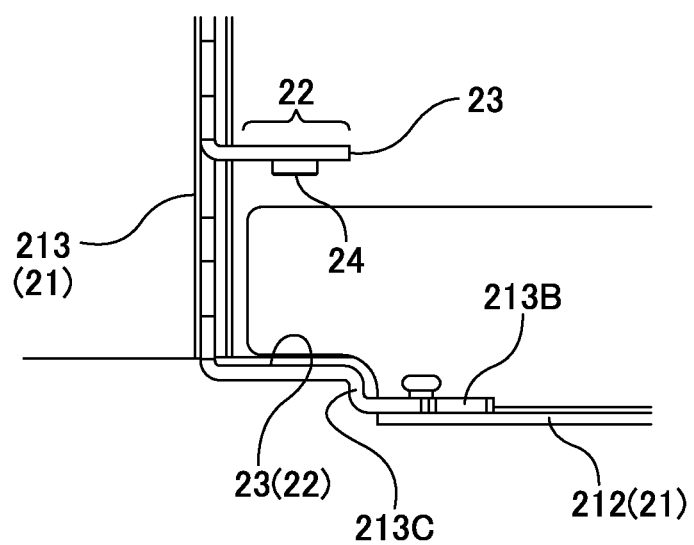
FIG. 4B is a front view of a lower edge and its vicinities of the casing 21.

FIG. 4B is a front view of a lower edge and its vicinities of the casing 21.

The lowermost arm part 23 includes a lower-plate fixing part 213B and a step part 213C. The lower-plate fixing part 213B is a part to which the lower plate 212 is fixed. The step part 213C is located between the lowermost arm part 23 and the lower-plate fixing part 213B and is a part serving to lower the height of the lower-plate fixing part 213B relative to the lowermost arm part 23. The lower plate 212 is supported by the lower-plate fixing part 213B and fixed to the lower-plate fixing part 213B with a rivet. The step part 213C lowers the height of the lower-plate fixing part 213B relative to the lowermost arm part 23 to such a degree that the head of the rivet is lower than the upper surface (slide surface) of the lowermost arm part 23. This configuration prevents interference between the rivet and the tray 30. Note that in one or more embodiments, the lower-plate fixing part 213B and the step part 213C are formed by bending the metal plate serving as the side face of the casing 21 into an L shape (this is described later. see FIG. 12A). In other words, in one or more embodiments, the side plate 213, the lower-plate fixing part 213B, and the step part 213C are composed of one member. This reduces the parts count. However, the lower-plate fixing part 213B and the step part 213C may be composed of a member different from the side plate 213.

In one or more embodiments, the lower plate 212 is fixed to the lower sides of the lower-plate fixing parts 213B (see FIG. 4B). Since this configuration makes it easy to make a gap between the bottom surface of the tray 30 stored at the bottom and the lower plate 212, even if the tray 30 is deformed so as to be warped by the weight of optical fibers (even if the tray 30 is deformed in an arch shape with the lower side convex), it is possible to prevent contact between the bottom surface of the tray 30 and the lower plate 212, and this improves sliding properties of the tray 30. However, a configuration in which the lower plate 212 is fixed to the upper sides of the lower-plate fixing parts 213B is possible.

The projection parts 24 are parts configured to interfere with upper parts of the tray 30 (specifically, swells 34 described later). The projection parts 24 are located to parts of the arm parts 23 close to the insertion opening 21A (on the front side, near the insertion opening 21A), in other words, to the distal ends of the arm parts 23 in the protruding direction. Since the upper parts of the tray 30 being drawn interfere with the projection parts 24 (see FIG. 10A), it is possible to prevent the tray 30 from unintentionally slipping out of the casing 21. The projection part 24 protrudes from the lower surface of the arm part 23 included in the support member 22. With this configuration, the projection part 24 located on the arm part 23 of a support member 22 interferes with an upper part of the tray 30 located under the support member 22. Thus, it is possible to prevent the plurality of trays 30 from slipping forward with the simple configuration, and it is possible to reduce the thickness of the plurality of arm parts 23 arranged in the up-down direction so that the dimension of the casing 21 can be reduced in the up-down direction.

Note that as illustrated in FIG. 5B, the projection part 24 configured to interfere with the tray 30 stored in the uppermost position is located on the upper-plate fixing part 213A. Since the uppermost projection part 24 is located on the upper-plate fixing part 213A to which the upper plate 211 is fixed, the configuration can be simple. However, the uppermost projection part 24 may be located on a member different from the upper-plate fixing part 213A.

Figure 6A:
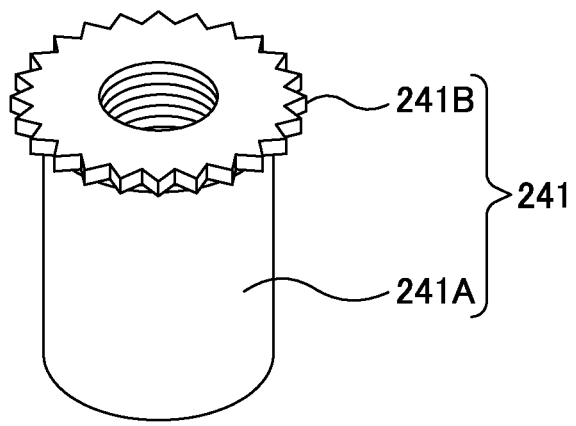
FIG. 6A is an explanatory diagram of a flanged protruding member 241 that serves as a projection part 24.

FIG. 6A is an explanatory diagram of a flanged protruding member 241 that serves as the projection part 24. The flanged protruding member 241 includes a protruding part 241A and a flange 241B. The protruding part 241A serves as the projection part 24. The flange 241B is a part (brim part) protruding outward from the outer surface of the protruding part 241A and configured to be press-fitted into the arm part 23. The protruding part 241A is smaller than (or less than) the diameter of the prepared hole in the arm part 23 (the through hole 23A illustrated in FIG. 6B), and the flange 241B is larger than the diameter of the prepared hole in the arm part 23 (the through hole 23A illustrated in FIG. 6B). The flanged protruding member 241 is, for example, a self-clinching spacer. However, the present disclosure is not limited to the self-clinching spacer, and a configuration without a threaded hole inside like the self-clinching spacer is possible.

Figure 6B:
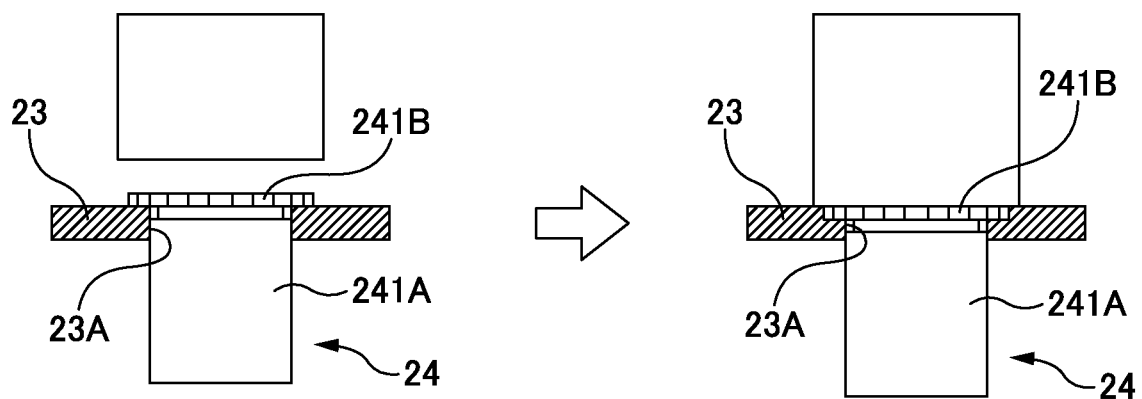
FIG. 6B is an explanatory diagram illustrating the projection part 24 being attached to an arm part 23.

FIG. 6B is an explanatory diagram illustrating the projection part 24 being attached to the arm part 23. The through hole 23A serving as the prepared hole is formed in advance in the arm part 23. The flanged protruding member 241 is inserted into the through hole 23A of the arm part 23 with the protruding part 241A protruding downward. The flange 241B protruding from the upper surface of the arm part 23 is press-fitted into the prepared hole by pressing, and the flanged protruding member 241 is thus attached to the arm part 23. By press-fitting the flange 241B into the through hole 23A with the flanged protruding member 241 protruding downward, the protruding part 241A protruding downward from the arm part 23 (the prepared hole) forms the projection part 24. In addition, since the flange 241B is press-fitted into the through hole 23A with the flanged protruding member 241 protruding downward, the upper surface of the arm part 23 becomes approximately flat, and this enables the tray 30 supported by the arm parts 23 to slide smoothly. In one or more embodiments, it is possible to make the upper surface of the arm part 23 flat and to locate the projection part 24 on the arm part 23 which is thin. However, a configuration in which the projection part 24 is formed without using the flanged protruding member 241 is possible. Note that it is desirable that the flange 241B be thinner than the arm part 23. This configuration makes the upper surface of the arm part 23 after pressing smoother.

Figure 7:
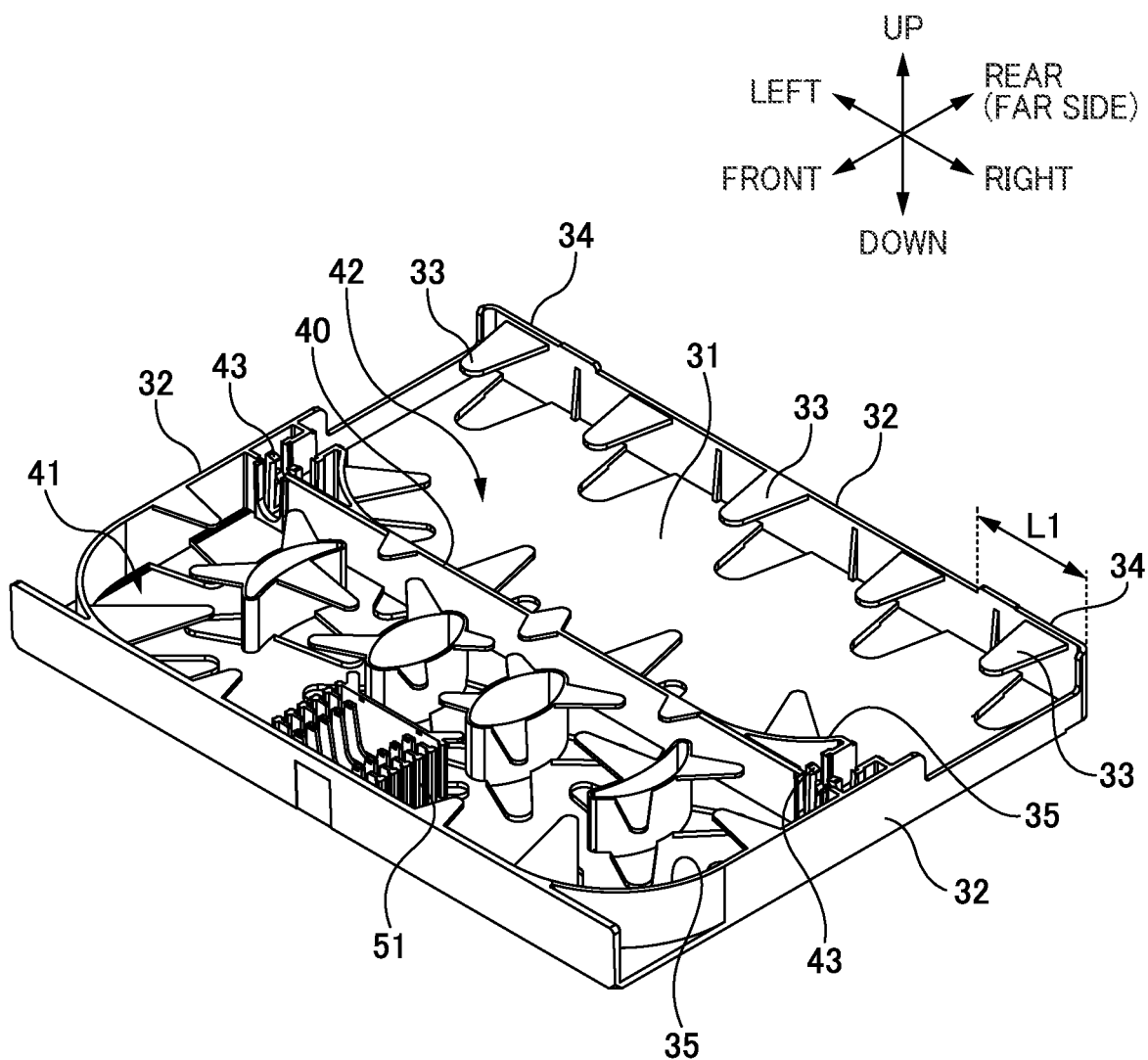
FIG. 7 is a perspective view of a tray 30.
Figure 8:
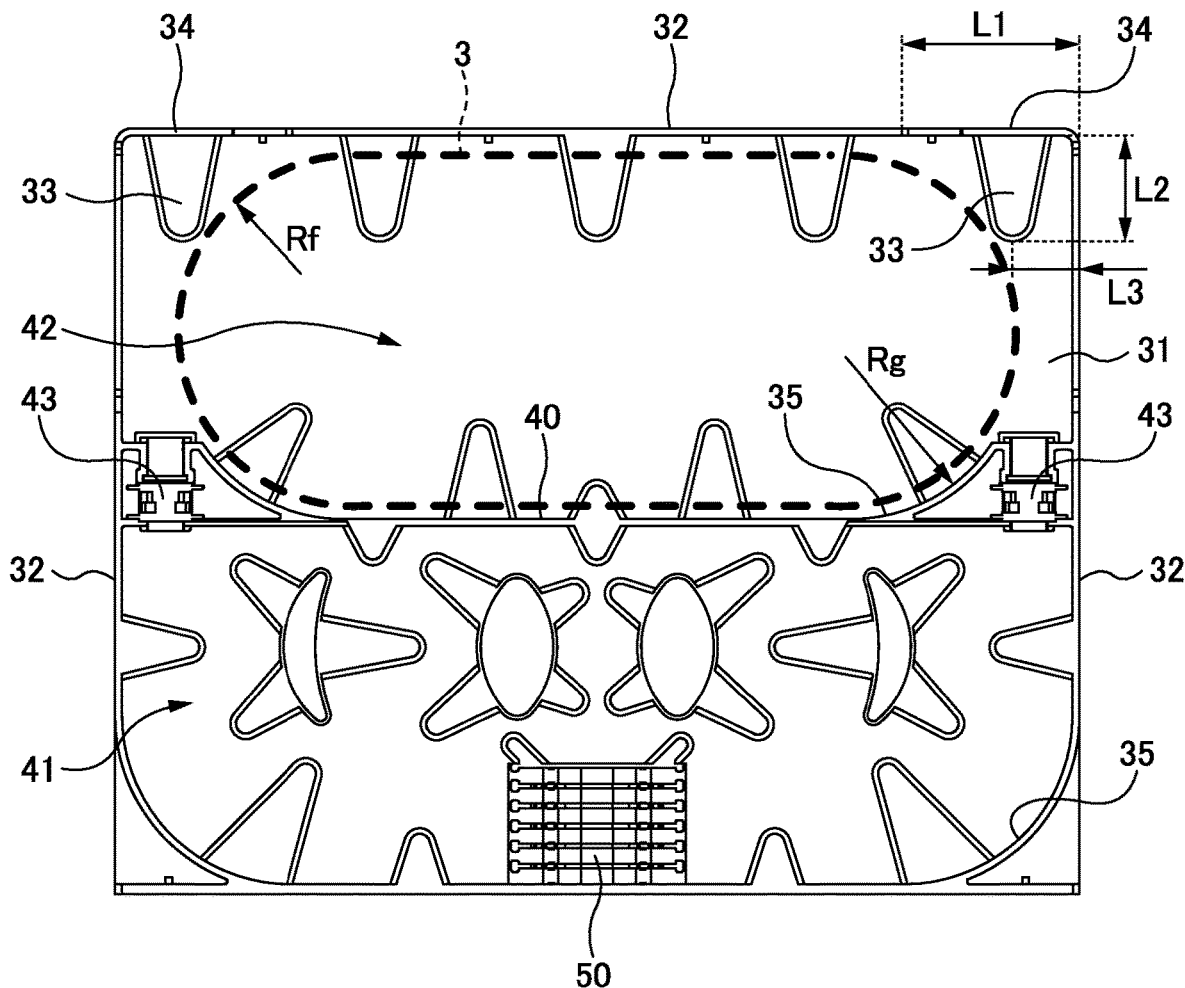
FIG. 8 is a top view of the tray 30.

FIG. 7 is a perspective view of the tray 30. FIG. 8 is a top view of the tray 30.

The tray 30 is a member for storing extra lengths of optical fibers. As illustrated in FIGS. 1 and 2, the tray 30 can be taken out of the accommodation rack 20. Since the tray 30 can be taken out of the accommodation rack 20, it is easy to store optical fibers in the tray 30.

The tray 30 includes a bottom part 31 and an edge part 32. The bottom part 31 is a part that serves as the bottom of the tray 30 and on which optical fibers are placed. The edge part 32 stands upward from the peripheral edge of the bottom part 31 and forms an accommodation space for optical fibers. The edge part 32 surrounds the accommodation space for optical fibers from the front to rear and from the left to right.

In one or more embodiments, the tray 30 includes a partition part 40. The partition part 40 partitions the accommodation space for optical fibers. By the partition part 40 partitioning the accommodation space for optical fibers, the tray 30 has a first accommodation part 41 and a second accommodation part 42.

The first accommodation part 41 is a front side accommodation space of the tray 30. The first accommodation part 41 stores fusion splice parts and extra lengths of optical fibers fusion spliced. The first accommodation part 41 includes a holding part 51. The holding part 51 is configured to hold fusion splice parts of optical fibers. The first accommodation part 41 is configured to store a plurality of fusion splice parts and extra lengths of a plurality of optical fibers (a plurality of optical fibers of the first optical cable 1A and a plurality of optical fibers of the second optical cable 1B) fusion spliced in fusion splice parts.

The second accommodation part 42 is a rear side accommodation space of the tray 30. The second accommodation part 42 is configured to store extra lengths of the optical fiber units 3 (see FIG. 1). As already described, the optical fiber unit 3 branched from the optical cable 1 is inserted through and protected by a protective tube (for example, a flexible mesh tube) and wired in the cabinet 10, and the second accommodation part 42 stores the optical fiber units 3 inserted through the protective tube. However, a configuration in which the optical fiber units 3 not inserted through protective tubes are stored in the second accommodation part 42 is possible.

Liaison parts 43 are located in both left and right ends of the partition part 40. The liaison parts 43 are where a plurality of optical fibers pass through between the first accommodation part 41 and the second accommodation part 42 (where a plurality of optical fibers are wired). The liaison parts 43 have recessed shapes and the upper sides are open.

Note that a configuration without a partition part 40 in the tray 30 is possible. In addition, a configuration in which the accommodation space of the tray 30 is not divided into the first accommodation part 41 and the second accommodation part 42 is possible. However, as in the tray 30 of one or more embodiments, the first accommodation part 41 and the second accommodation part 42 formed by the partition part 40 make it easy to perform separately the work of storing optical fibers fusion spliced and the work of storing optical fiber units 3.

The tray 30 includes guide surfaces 35. The guide surfaces 35 are located on the inside of the edge part 32 and guide stored optical fibers to be curved. The guide surface 35 guides optical fibers to be curved not sharply. Hence, the bending radius of the guide surface 35 is set to be larger than or equal to the specified allowable bending radius of the optical fiber. Note that in the following description, Rg (mm) is defined as the bending radius of the guide surface 35 (see FIG. 8), and Rf (mm) as the allowable bending radius of the optical fiber.

Figure 9:
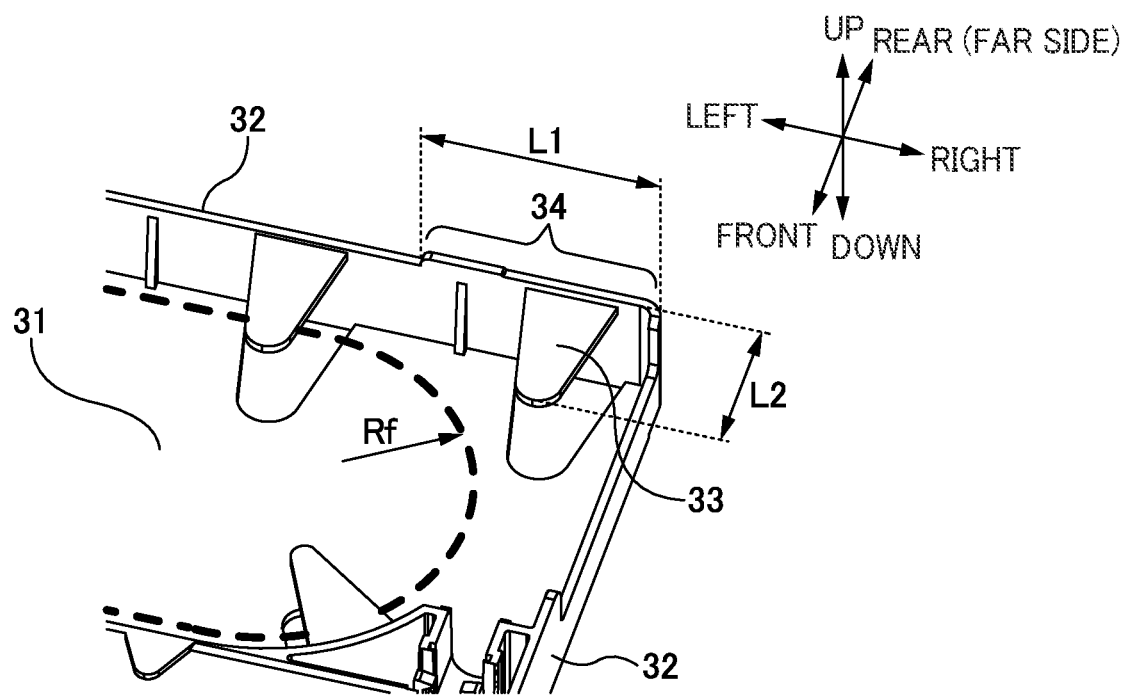
FIG. 9 is an enlarged perspective view of a swell (or ridge) 34 and its surroundings of one or more embodiments.

As illustrated in FIGS. 7 and 8, the tray 30 of one or more embodiments includes tab parts 33 and the swells (or ridges) 34. FIG. 9 is an enlarged perspective view of a swell 34 and its surroundings of one or more embodiments. Note that FIGS. 8 and 9 indicate optical fibers (an optical fiber unit 3) stored in the second accommodation part 42 with a dotted line.

The tab part 33 is configured to hold the optical fibers placed on the bottom part 31 (including the optical fibers of the optical fiber unit 3) from above. The tab part 33 extends from the edge part 32 toward the accommodation space for optical fibers (the first accommodation part 41 or the second accommodation part 42). The tab part 33 is a plate-shaped part parallel to the bottom part 31, and the optical fibers are held between the bottom part 31 and the tab parts 33. This configuration prevents the optical fibers placed on the bottom part 31 from rising from the bottom part 31. Note that if the optical fibers stored in the tray 30 rise from the bottom part 31, there is a possibility that the optical fibers can be caught between the tray 30 and the accommodation rack 20 when the tray 30 is attached or detached. In contrast, the tab parts 33 holding the optical fibers from above prevent the optical fibers from being caught between the tray 30 and the accommodation rack 20.

The swell 34 is configured to interfere with the projection part 24. When the tray 30 is pulled out of the accommodation rack 20, the swells 34 of the tray 30 interfere with the projection parts 24 of the arm parts 23, and this prevents the tray 30 from coming forward off the casing 21 unintentionally (see FIG. 10A). The swells 34 are located on the rear edge part 32 (rear edge) of the tray 30 and protrude upward.

Figure 13:
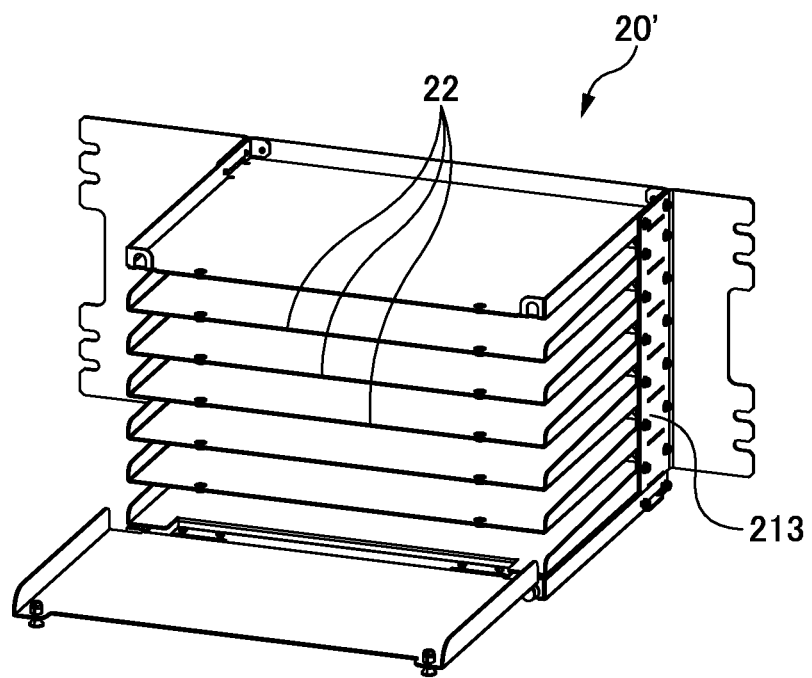
FIG. 13 is an explanatory diagram of an accommodation rack 20' of a comparative example.

FIG. 13 is an explanatory diagram of an accommodation rack 20' a comparative example. In the comparative example, the support member 22 of the tray 30 is plate-shaped and configured to support the entire bottom surface of the tray 30 from the lower side. Since the plurality of trays 30 are arranged in the up-down direction, the plate-shaped support members 22 of the comparative example are also arranged in the up-down direction. Thus, in the comparative example, the plate-shaped support members 22 are arranged in the up-down direction also in the center part in the left-right direction of the accommodation rack 20'.

Meanwhile, the tray 30 is a molded part made of a resin, and hence, there is a possibility that the tray 30 can deform to be warped (the tray 30 sometimes deforms in an arch shape with the bottom side convex). In the case of the accommodation rack 20' of the comparative example, the plate-shaped support members 22 are arranged in the up-down direction also in the center part in the left-right direction. Hence in the case in which trays 30 deformed in arch shapes are stored to be arranged in the up-down direction, there is a possibility that the tray 30 cannot slide smoothly. In the structure of the accommodation rack 20' of the comparative example, to store trays 30 deformed in arch shapes so as to be arranged in the up-down direction, the intervals of the plate-shaped support members 22 in the up-down direction need to be larger. As a result, the dimension in the up-down direction of the accommodation rack 20' becomes larger.

In contrast, in one or more embodiments, a pair of arm parts 23 serve as a support member 22, and the pair of arm parts 23 are located apart in the left-right direction. With this configuration, in one or more embodiments, the accommodation rack 20 has a hollow structure in the center part in the left-right direction. Thus, in one or more embodiments, even if trays 30 are deformed to be warped (trays 30 are deformed in arch shapes with the lower sides convex), lower parts of the trays 30 deformed to be convex are allowed to be in between the pair of arm parts 23 (the hollow part). Hence, in one or more embodiments, since the pairs of arm parts 23 are located apart in the left-right direction, sliding properties of the trays 30 are improved, compared to those with the accommodation rack 20' of the comparative example.

In addition, in the case in which tray 30 is deformed to be warped (in the case in which tray 30 is deformed in an arch shape with the lower side convex), the heights (the positions in the up-down direction) of the swells 34 of the tray 30 changes. As a result, there is a possibility that the swells 34 of the tray 30 cannot interfere with the projection parts 24. In contrast, in one or more embodiments, since the projection parts 24 are located on the arm parts 23 located on relatively outer positions in the left-right direction, the swells 34 configured to interfere with the projection parts 24 are also located at relatively outer parts of the tray 30 in the left-right direction. Hence, in one or more embodiments, even if the tray 30 is deformed to be warped in an arch shape, the change in the positions in the up-down direction of the swells 34 of the tray 30 can be small. Thus, it is possible to avoid the situation in which the swells 34 of the tray 30 do not interfere with the projection part 24 of the arm part 23.

Meanwhile, there is a possibility that optical fibers can rise from the bottom part 31 in the areas outside the tab parts 33. If optical fibers rise from the bottom part 31, there is a possibility that the optical fibers can be caught between the swells 34 of the tray 30 and the projection parts 24 of the arm parts 23 when the tray 30 is pulled out of the accommodation rack 20. In contrast, in one or more embodiments, as illustrated in FIG. 9, the swell 34 is located so as to protrude upward from the proximal end of a tab part 33 (the end on the edge part 32 side of a tab part 33 extending from the edge part 32, in this case, the rear end of a tab part 33). With this structure, in one or more embodiments, when a tray 30 is pulled out of the accommodation rack 20, the swells 34 of the tray 30 interfere with the projection parts 24 of the arm parts 23 over the tab parts 33. At least in the positions where the tab parts 33 are located, it is possible to prevent optical fibers from rising from the bottom part 31. Thus, in one or more embodiments, it is possible to prevent optical fibers from being caught between the swells 34 of the tray 30 and the projection parts 24 of the arm parts 23 when a tray 30 is pulled out of the accommodation rack 20. For this reason, it is desirable that the swells 34 protrude upward from the proximal ends of the tab parts 33.

In one or more embodiments, as illustrated in FIG. 8, the distance between the outer edge in the left-right direction of the tray 30 and the inner edge in the left-right direction of the swell 34 is defined as L1 (mm). Then, in one or more embodiments, the distance L1 is set to be smaller than (or less than) the bending radius Rg of the guide surface 35 (L1<Rg). As already described, since the curve of the optical fibers stored in the tray 30 is guided by the guide surface 35, optical fibers do not come into contact with the edge part 32 on the rear side (the parts of the edge part 32 on which the swells 34 are located) within the ranges of the distances Rg from the outer edges in the left-right direction of the tray 30. Since the distance L1 illustrated in FIG. 8 is shorter than the bending radius Rg of the guide surface 35, optical fibers are not present at the edge part 32 near the swells 34, and thus it is possible to prevent optical fibers from being caught between the swells 34 of the tray 30 and the projection parts 24 of the arm parts 23.

For the same reason, it is desirable that the distance L1 between the outer edge in the left-right direction of the tray 30 and the inner edge of the swell 34 in the left-right direction be smaller than (or less than) the allowable bending radius Rf of the optical fiber. In addition, it is desirable that the distance L1 between the outer edge in the left-right direction of the tray 30 and the inner edge in the left-right direction of the swell 34 be smaller than (or less than) the bending radius Rf' of the optical fiber curved and stored in the tray 30 (Note that optical fibers are stored so as not to be curved at a radius smaller than (or less than) the allowable bending radius Rf. Thus, the bending radius Rf' of the optical fibers curved and stored in the tray 30 is larger than the allowable bending radius Rf). With this configuration, since optical fibers are not present at the edge part 32 near the swells 34, it is possible to prevent optical fibers from being caught between the swells 34 of the tray 30 and the projection parts 24 of the arm parts 23.

Figure 10A:
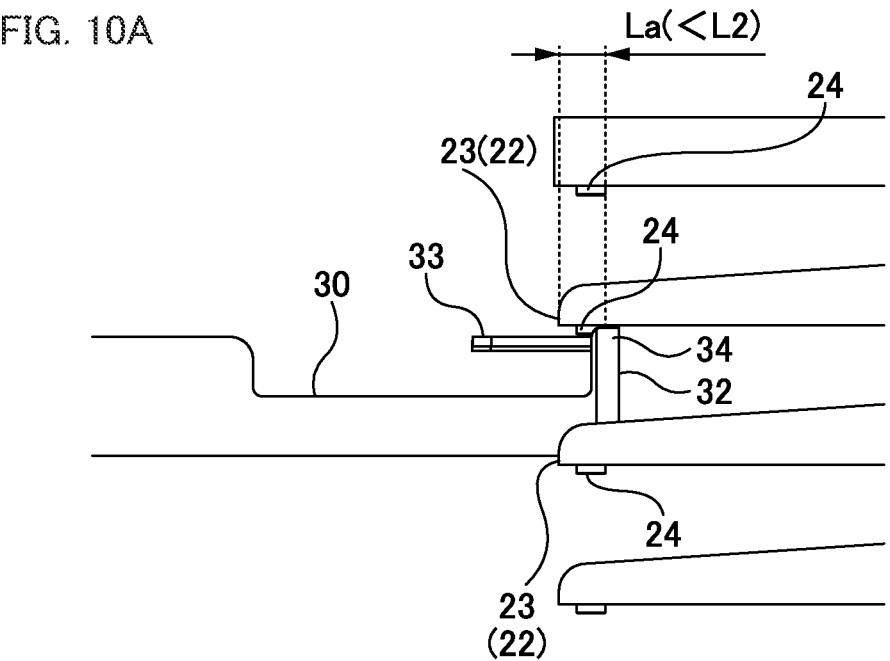
FIG. 10A is an explanatory diagram illustrating a swell 34 of a tray 30 interfering with the projection part 24 of an arm part 23.
Figure 10B:
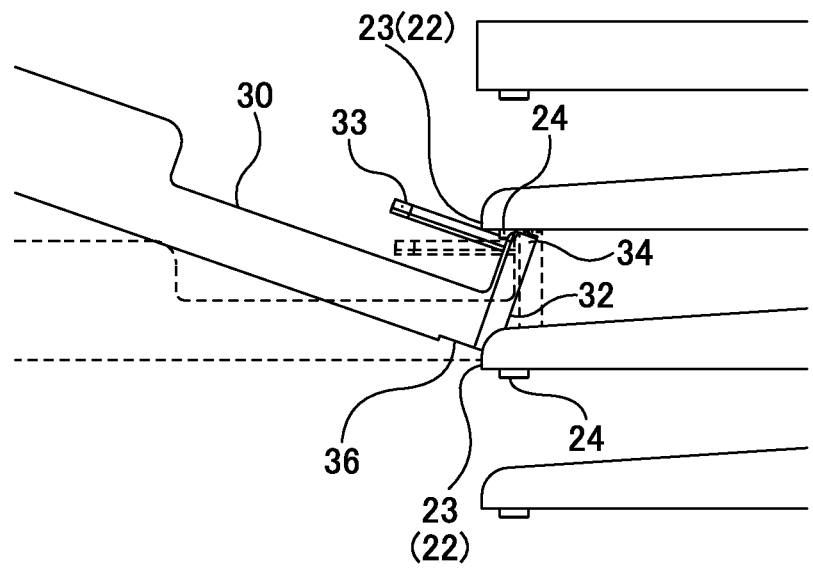
FIG. 10B is an explanatory diagram of a tray 30 being attached or detached.
Figure 10C:
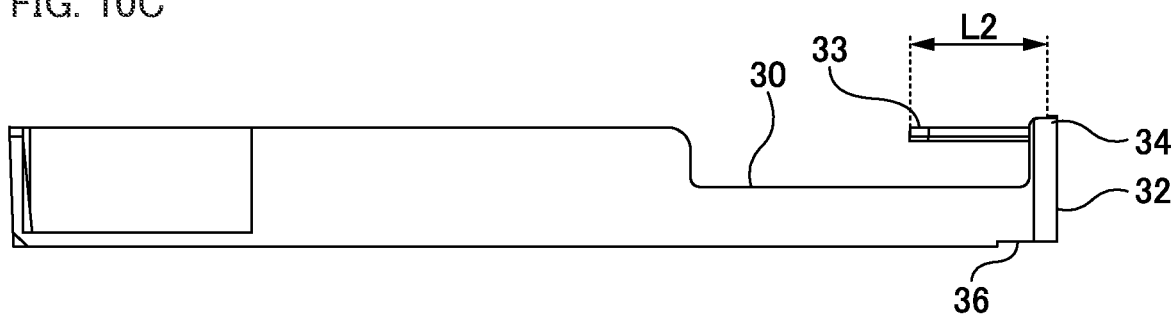
FIG. 10C is a side view of a tray 30.
Figure 11:
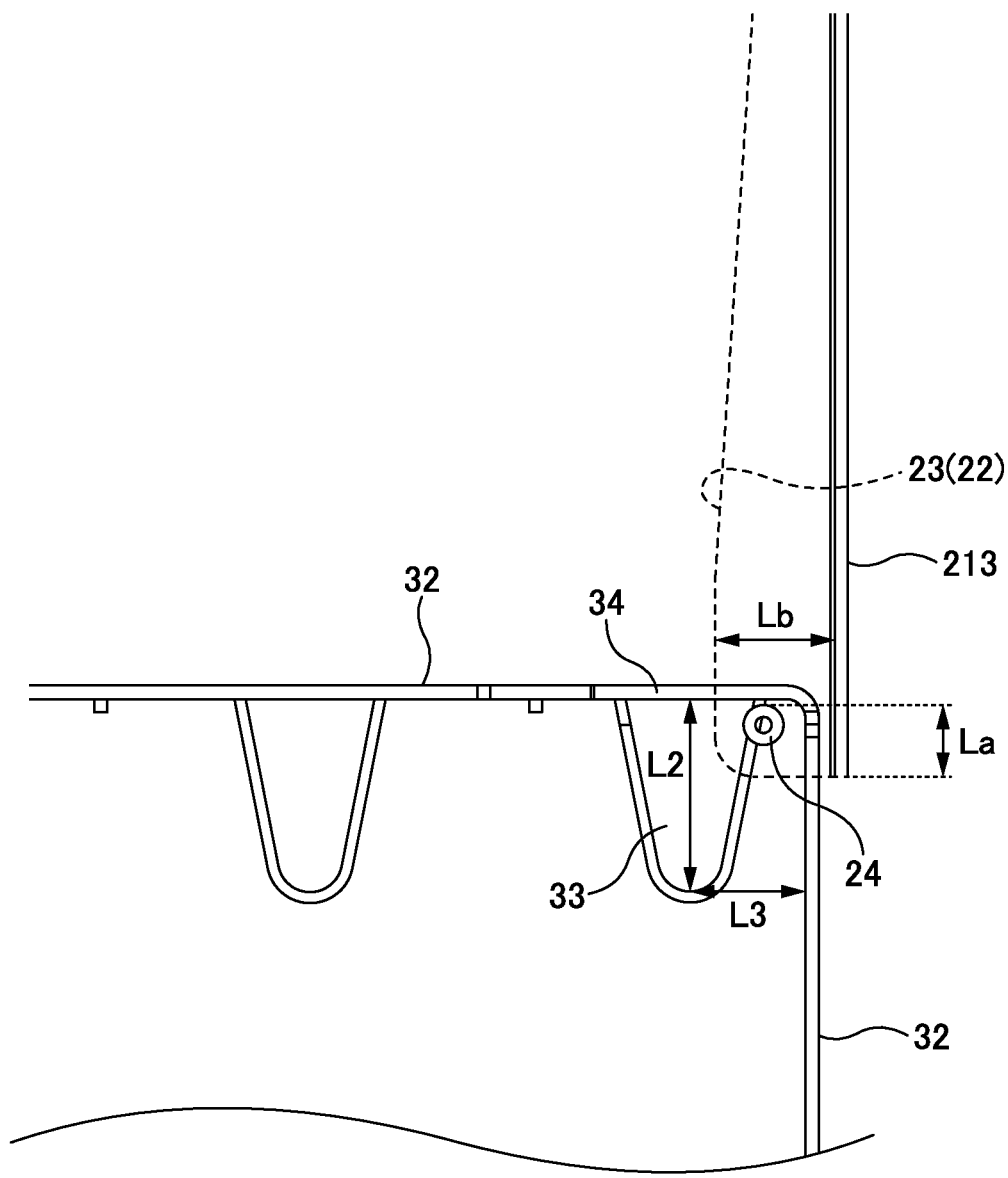
FIG. 11 is an enlarged top view of a swell 34 of the tray 30 interfering with the projection part 24 of an arm part 23.

FIG. 10A is an explanatory diagram illustrating a swell 34 of a tray 30 interfering with the projection part 24 of an arm part 23. FIG. 10B is an explanatory diagram illustrating the tray 30 being attached or detached. FIG. 10C is a side view of the tray 30. FIG. 11 is an enlarged top view of a swell 34 of the tray 30 interfering with the projection part 24 of an arm part 23. In FIG. 11, to show the positional relationship between the tray 30 and the projection part 24, the arm part 23 is illustrated as if it is transparent.

As illustrated in FIGS. 10A and 11, when a tray 30 stored in the accommodation rack 20 is pulled out, the swell 34 of the tray 30 interferes with the projection part 24 of the arm part 23. This configuration prevents the tray 30 from coming forward off the casing 21 unintentionally. As described above, since the swell 34 of the tray 30 interferes with the projection part 24 of the arm part 23, in order to take the tray 30 out of the accommodation rack 20, the front part of the tray 30 needs to be lifted up as illustrated in FIG. 10B so that the tray 30 is inclined to avoid the interference between the swell 34 of the tray 30 and the projection part 24 of the arm part 23. Conversely, to store a tray 30 taken out into the accommodation rack 20, the rear part of the tray 30 needs to be lowered so that the tray 30 is inclined to avoid the interference between the swell 34 of the tray 30 and the projection part 24 of the arm part 23.

In contrast, as already described, in one or more embodiments, the swell 34 protrudes upward from the proximal end of the tab part 33 (the end part on the edge part 32 side of the tab part 33 extending from the edge part 32) (see FIG. 9), and the projection part 24 is located on the arm part 23 (see FIG. 5B). Hence, this structure, when a tray 30 is inclined to be attached or detached, tends to cause the tab parts 33 of the tray 30 to interfere with the front edges of the arm parts 23.

In contrast, in one or more embodiments, the projection part 24 is located at a position relatively close to the front side of the arm part 23 so that the distance La between the front edge of the arm part 23 and the rear edge (the part that interferes with the swell 34) of the projection part 24 (see FIGS. 10A and 11) is shorter than the protruding length L2 of the tab part 33 (see FIG. 11, the dimension in the front-rear direction from the proximal end of the tab part 33 where the projection part 24 is located to the top part (or the top) of the tab part 33) (La<L2). Since the distance La is set to be shorter than the protruding length L2 of the tab part 33, when the swell 34 is interfering with the projection part 24 of the arm part 23 as illustrated in FIG. 10A, the front end of the tab part 33 is located outside the arm part 23. Thus, as illustrated in FIG. 10B, it is possible to prevent interference between the front end of the tab part 33 of the tray 30 and the arm part 23 when the tray 30 is inclined to be attached or detached. Hence, it is desirable that the distance La between the front edge of the arm part 23 and the rear edge (the part that interferes with the swell 34) of the projection part 24 be smaller than (or less than) the protruding length L2 of the tab part 33.

In one or more embodiments, the width Lb to the front side of the arm part 23 (see FIGS. 5B and 11) is shorter than the dimension L3 in the left-right direction between the top part of the tab part 33 and the outer edge in the left-right direction of the tray 30 (see FIGS. 8 and 11) (Lb<L3). Thus, it is possible, as illustrated in FIG. 10B, to prevent the top part (the end part that projects most) of the tab part 33 from interfering with the arm part 23 when the tray 30 is inclined to be attached or detached. Hence, it is desirable that the width Lb of the arm part 23 be smaller than (or less than) the dimension L3. However, a configuration in which the width of the arm part 23 is larger than the dimension L3 is possible.

In addition, in one or more embodiments, the tray 30 has a recess part 36 as illustrated in FIG. 10C. The recess part 36 is a recessed part formed in the rear edge of the lower surface of the tray 30. The lower surface of the recess part 36 is located higher than the other lower surface. The recess part 36 is located in the entire length in the left-right direction of the tray 30. The dimension of the tray 30 in the up-down direction is smaller in the part where the recess part 36 is located by the depth of the recess part 36 than in the other parts. Since the swells 34 are located in the edge part 32 to the rear of the tray 30, the recess part 36 is located beneath the swell 34.

In one or more embodiments, since the recess part 36 is located in the rear edge of the lower surface of the tray 30, when the tray 30 is inclined to be attached or detached, the heights of the swell 34 and the tab part 33 can be lowered, and this prevents interference between the tab parts 33 of the tray 30 and the front edges of the arm parts 23 of the accommodation rack 20. In addition, because the corner of the recess part 36 is touched at the distal ends of the arm parts 23 when the operator pulls out the tray 30 and does some work, even if the operator inadvertently pushes the tray 30 during the work, the tray 30 is prevented from moving back toward the accommodation rack 20. Hence, in the case in which the swell 34 protrudes upward from the proximal end of the tab part 33 (the end part on the edge part 32 side of the tab part 33 extending from the edge part 32), locating the recess part 36 in the rear edge of the lower surface of the tray 30 is particularly effective. However, a configuration in which the tray 30 does not have a recess part 36 is possible.

Figure 12A:
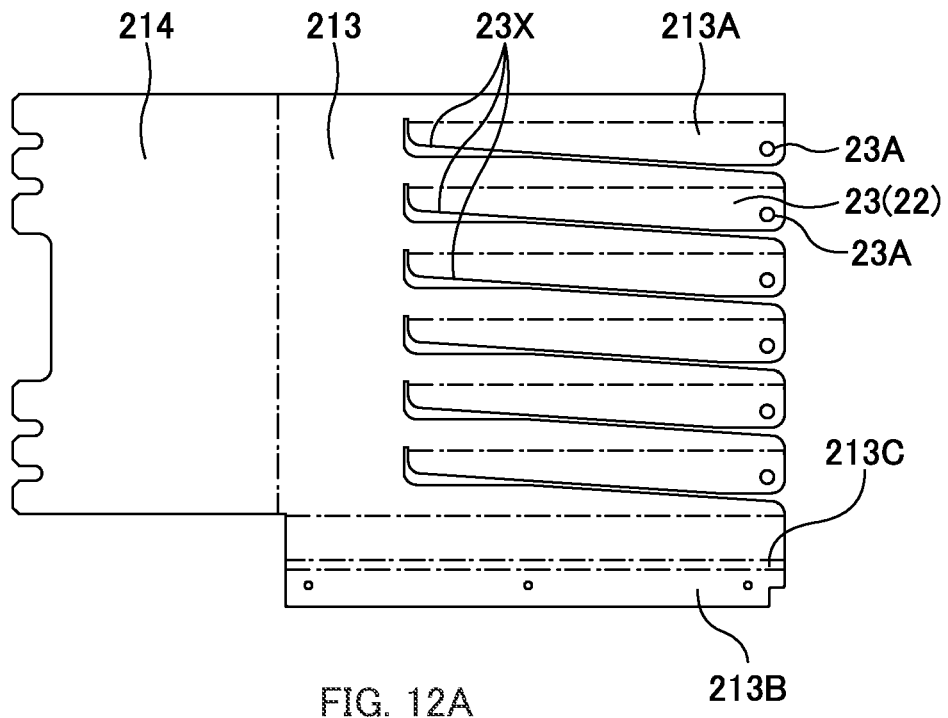
FIGS. 12A and 12B are explanatory diagrams illustrating an accommodation rack 20 (in particular, a side plate 213) of one or more embodiments during production.
Figure 12B:
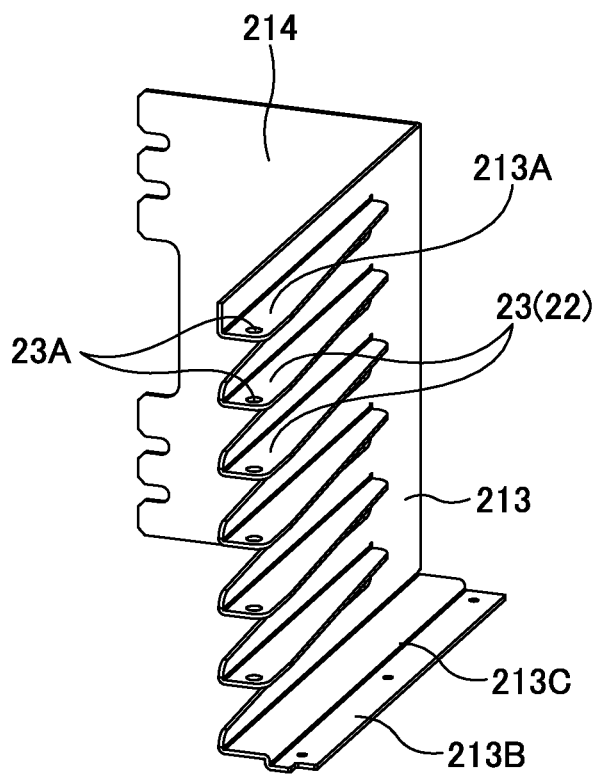

FIGS. 12A and 12B are explanatory diagrams illustrating the accommodation unit 11 (in particular, the side plate 213) of one or more embodiments during production.

As illustrated in FIG. 12A, in one or more embodiments, when the accommodation unit 11 is manufactured, a plurality of slits 23X are formed in a metal plate to serve as (that constitutes) a side face (a side plate 213) of the casing 21. Next, as illustrated in FIG. 12B, the metal plate is bent to make an L shape at each slit 23X to form a plurality of arm parts 23 in the metal plate (the side plate 213) (the metal plate is bent to make L shapes along dotted lines in FIG. 12A). Two metal plates (side plates 213) to serve as the side faces of the casing 21 are prepared, and the metal plates are bent in the directions opposite to each other at each slit 23X of the metal plate to form the arm parts 23. Thus, the pair of metal plates (side plates 213) bent in the opposite directions are prepared. In addition, each metal plate (the side plate 213) to serve as the side face of the casing 21 is bent to form also the upper-plate fixing part 213A, the lower-plate fixing part 213B, the step part 213C, and the fixing part 214. Then, the projection part 24 is attached to the prepared hole 23A of each arm part 23 as illustrated in FIG. 6B. Then, in the state in which the pair of metal plates (the side plates 213) with the plurality of arm parts 23 formed are placed apart from each other, the upper plate 211 and the lower plate 212 are attached to form the casing 21. Through these processes, it is possible to manufacture the accommodation unit 11 including the casing 21 and the plurality of support members 22, with each support member 22 including the pair of arm parts 23 and the projection parts 24.

In one or more embodiments, the arm parts 23 are formed by bending the metal plate to serve as the side face of the casing 21 to make L shapes. With this configuration, in one or more embodiments, the side plate 213 and the plurality of arm parts 23 are composed of one member. Note that as illustrated in the comparative example in FIG. 13, in the case in which the side plates 213 and the arm parts 23 are made of different members, there is a possibility that the intervals in the up-down direction of the plurality of arm parts 23 have a variation when the plurality of arm parts 23 are attached to the side plates 213. In addition, as illustrated in the comparative example in FIG. 13, in the case in which the side plates 213 and the arm parts 23 are made of different members, there is also a possibility that the members (for example, rivets) that couple the side plates 213 and the arm parts 23 protrude inside the casing 21 and come into contact with the trays 30. In contrast, in one or more embodiments, since the plurality of arm parts 23 are formed by bending the metal plate to serve as the side face of the casing 21 to make L shapes, one or more embodiments have an advantage of reducing the variation in the intervals in the up-down direction of the plurality of arm parts 23. In addition, since the side plate 213 and the plurality of arm parts 23 are composed of one member, one or more embodiments have an advantage that the parts count is smaller than (or less than) that of the comparative example illustrated in FIG. 13 (in addition, since there is no member for connecting the side plate 213 and the arm parts 23, the members that would couple the side plate 213 and the arm parts 23 do not protrude from the inner wall of the side plate 213, and thus it is possible to prevent such members from coming into contact with the trays 30).

Other Embodiments

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

REFERENCE SIGNS LIST 1 optical cable
1A first optical cable
1B second optical cable
3 optical fiber unit
3A first optical fiber unit
3B second optical fiber unit
10 cabinet
11 accommodation unit
20 accommodation rack
21 casing
21A insertion opening
21B front panel
211 upper plate
212 lower plate 213 side plate
213A upper-plate fixing part
213B lower-plate fixing part
213C step part
214 fixing part
22 support member
23 arm part
23A through hole
23X slit
24 projection part
241 flanged protruding member
241A protruding part
241B flange
30 tray
31 bottom part
32 edge part
33 tab part
34 swell
35 guide surface
36 recess part
40 partition part
41 first accommodation part
42 second accommodation part
43 liaison part
51 holding part

The invention claimed is:

1. An accommodation unit comprising:
 a casing that:
  stores trays each storing an optical fiber, and
  includes an insertion opening into which the trays are inserted to be arranged in an up-down direction; and
 support members disposed in the casing, wherein
 each of the support members slidably supports a lower part of each of the trays, and
 each of the support members includes:
  a pair of arm parts disposed apart from each other in a left-right direction orthogonal to a slide direction of the trays and the up-down direction; and
  a projection that is disposed on each of the arm parts in a vicinity of the insertion opening, and contacts an upper part of each of the trays under each of the support members.

2. The accommodation unit according to claim 1, further comprising
 the trays, wherein
 each of the trays includes:
  a bottom part on which the optical fiber is placed;
  an edge part that stands upward from the bottom part and forms an accommodation space for the optical fiber;
  a tab part that extends from the edge part toward the accommodation space, and holds, from above, the optical fiber placed on the bottom part; and
  a ridge that is formed in the edge part, protrudes upward from a proximal end of the tab part, and contacts the projection disposed on each of the arm parts.

3. The accommodation unit according to claim 2, wherein a distance between a front edge of each of the arm parts and a rear edge of the projection is shorter than a protruding length of the tab part.

4. The accommodation unit according to claim 2, wherein a width of each of the arm parts is shorter than a dimension in the left-right direction between a top of the tab part and an outer edge in the left-right direction of each of the trays.

5. The accommodation unit according to claim 2, wherein a recess part is formed in a lower surface of each of the trays and beneath the ridge.

6. The accommodation unit according to claim 2, wherein each of the trays has a guide surface inside the edge part, wherein the guide surface curves the optical fiber stored in each of the trays, and
a distance between an outer edge in the left-right direction of each of the trays and an inner edge in the left-right direction of the ridge is less than a bending radius of the guide surface.

7. The accommodation unit according to claim 6, wherein the bending radius of the guide surface is equal to or larger than an allowable bending radius of the optical fiber stored in each of the trays.

8. The accommodation unit according to claim 1, wherein the width in the left-right direction of each of the arm parts decreases toward the rear in the slide direction.

9. The accommodation unit according to claim 1, wherein the arm parts arranged in the up-down direction are formed by bending metal plates that constitute side faces of the casing.

10. The accommodation unit according to claim 1, wherein
 each of the arm parts has a through hole, and
 the projection is formed by a flanged protruding member that comprises a flange press-fitted into the through hole in a state that the flanged protruding member protrudes downward from the through hole.

11. A method for manufacturing an accommodation unit, the method comprising:
 forming arm parts by bending metal plates;
 forming a casing by placing a pair of the metal plates to be apart from each other, wherein
  the casing:
   stores trays each storing an optical fiber, and
   includes an insertion opening into which the trays are inserted to be arranged in an up-down direction; and
 disposing support members in the casing, wherein
  each of the support members slidably supports a lower part of each of the trays, and
  each of the support members includes:
   a pair of the arm parts disposed apart from each other in a left-right direction orthogonal to a slide direction of the trays and the up-down direction, and
   a projection that is disposed on each of the arm parts in a vicinity of the insertion opening, and contacts an upper part of each of the trays under each of the support members.

* * * * *